United States Patent
Weiss et al.

(10) Patent No.: US 11,566,861 B2
(45) Date of Patent: Jan. 31, 2023

(54) DEVICE SYSTEM AND METHOD FOR PROJECTILE LAUNCHER OPERATION MONITORING

(71) Applicant: Senseer Ltd., Herzliya (IL)

(72) Inventors: Itay Weiss, Tel Aviv (IL); Ilan Hyden, Mey Ami (IL)

(73) Assignee: SENSEER LTD, Herzliya (IL)

(*) Notice: Subject to any disclaimer, the term of this patent is extended or adjusted under 35 U.S.C. 154(b) by 39 days.

(21) Appl. No.: 17/058,095

(22) PCT Filed: May 23, 2019

(86) PCT No.: PCT/IB2019/054294
§ 371 (c)(1),
(2) Date: Nov. 23, 2020

(87) PCT Pub. No.: WO2019/224781
PCT Pub. Date: Nov. 28, 2019

(65) Prior Publication Data
US 2021/0199400 A1    Jul. 1, 2021

Related U.S. Application Data

(60) Provisional application No. 62/675,350, filed on May 23, 2018.

(51) Int. Cl.
*F41A 17/08* (2006.01)
*F41A 17/06* (2006.01)
(Continued)

(52) U.S. Cl.
CPC .............. *F41A 17/08* (2013.01); *F41A 17/06* (2013.01); *F41A 19/01* (2013.01); *F41G 3/02* (2013.01)

(58) Field of Classification Search
CPC .................................. F41A 17/08; F41A 19/01
See application file for complete search history.

(56) References Cited

U.S. PATENT DOCUMENTS 4,777,864 A * 10/1988 Siech ...................... F41A 9/45
700/15
7,669,356 B2 * 3/2010 Joannes .................. F41A 19/01
42/1.03
(Continued)

OTHER PUBLICATIONS

Written Opinion dated Jun. 19, 2020 for International Application No. PCT/IB19/54294 in 6 pages.
(Continued)

*Primary Examiner* — Joshua E Freeman
(74) *Attorney, Agent, or Firm* — Knobbe, Martens, Olson & Bear, LLP

(57) ABSTRACT

The projectile-launcher operation monitoring device includes at least one displacement-sensor and a processor coupled with the displacement-sensor. The displacement-sensor acquires measurements relating to the displacement of the projectile-launcher and to produce a sampled time signal of values relating to the displacement. The processor receives from the displacement-sensor the sampled time signal to determine projectile-launcher operation parameters therefrom, by employing a deep-learning system. The deep-learning system includes an encoder receiving sample-frames from the sampled time signal producing codes relating to the sample-frames. Each of the codes is a vector of values relating to the probabilities of features in the received sample-frames.

21 Claims, 13 Drawing Sheets

(51) Int. Cl.
*F41A 19/01* (2006.01)
*F41G 3/02* (2006.01)

(56) References Cited

U.S. PATENT DOCUMENTS

| | | | | |
|---|---|---|---|---|
| 10,869,159 | B1* | 12/2020 | Nguyen | H04W 4/021 |
| 2011/0252684 | A1* | 10/2011 | Ufer | F41A 19/01 |
| | | | | 42/1.03 |
| 2014/0190051 | A1* | 7/2014 | Wichner | F41A 17/12 |
| | | | | 42/1.05 |
| 2015/0253109 | A1* | 9/2015 | Wichner | F41A 17/08 |
| | | | | 434/19 |
| 2015/0337436 | A1 | 11/2015 | Gregg et al. | |
| 2015/0338436 | A1* | 11/2015 | Loeffler | G01P 1/023 |
| | | | | 702/141 |
| 2017/0010062 | A1* | 1/2017 | Black | F41A 17/063 |
| 2017/0146319 | A1* | 5/2017 | Lyren | G06T 7/20 |
| 2017/0332051 | A1* | 11/2017 | Stern | F41B 5/1492 |
| 2019/0281259 | A1* | 9/2019 | Palazzolo | H04N 7/183 |
| 2020/0232762 | A1* | 7/2020 | Hamilton | F41A 9/62 |

OTHER PUBLICATIONS

International Search Report dated Jun. 19, 2020 for International Application No. PCT/IB19/54294 in 2 pages.

* cited by examiner

DEVICE SYSTEM AND METHOD FOR PROJECTILE LAUNCHER OPERATION MONITORING

FIELD OF THE DISCLOSED TECHNIQUE

The disclosed technique relates to projectile launchers, in general, and to device system and method for projectile launcher operation monitoring, in particular.

BACKGROUND OF THE DISCLOSED TECHNIQUE

Monitoring projectile launchers (e.g., a handgun, a rifle, a machine gun, a rocket launcher, a tank and the like) carries various benefits. For example, known in the art are counters that counting the number of shots made by a rifle or a sidearm may provide an indication regarding the number of rounds left. Counting the number of shots may also aid in preventive maintenance by providing an indication when maintenance task should be performed.

U.S. Pat. No. 7,669,356 to Joannes, et al, entitled "Device for detecting and counting shots fired by an automatic or semi-automatic firearm, and firearm equipped with such a device" is directed at a device for detecting and counting shots fired by an automatic or semi-automatic firearm with a barrel and moving parts to recock the firearm. The device includes an accelerometer, a memory, and a microprocessor. The accelerometer includes a pass band that is tuned such to be sensitive to shocks in the axial direction of the barrel that slides for every fired shot in the axial direction between a front position and a rear position. The progression in time of the accelerations is typical for the firearm and thus forms a typical acceleration signature for that firearm and for the type of ammunition being used. The accelerometer provides a signal to the microprocessor that employs an algorithm for counting the number of shots fired, based on the acceleration signature having a plurality of characteristic elements that include acceleration pulses, acceleration variations, calm zones during which the level of the signal of the accelerometer is practically zero. The memory stores the characteristic elements prior to use of the device.

U.S. Patent Application Publication No. 2011/0252684 entitled "Self calibrating weapon shot counter" to Ufer et al, is directed at a device for counting the number of rounds fired through a weapon. The device includes a microcontroller module, a microelectromechanical system (MEMS) accelerometer, a non-volatile memory, a normally closed switch, a serial communication device, and a wake up circuit. The microcontroller module includes a microcontroller, the MEMS accelerometer, which in turn includes the normally closed switch. The memory stores shot profile data that includes shot count and recoil data. The microcontroller module is affixed to the firearm. The MEMS accelerometer is in the plane of firing of the firearm, and measures the G force of each round fired by the firearm. The microcontroller interrogates or periodically samples the MEMS accelerometer and its output. The microcontroller converts the analog output of the MEMS accelerometer to digital form. The serial communication device transmits the shot profile data stored in the memory, via a radio frequency (RF) signal. The wake up circuit is adapted to switch upon detection of a fired shot to signal the microcontroller to initialize a low power mode to activate the MEMS accelerometer faster than it would activate by itself, thereby enabling the MEMS accelerometer to wake up fast enough to capture the entire energy pulse.

SUMMARY OF THE PRESENT DISCLOSED TECHNIQUE

It is an object of the disclosed technique to provide a novel a device system and method for projectile launcher operation monitoring. In accordance with the disclosed technique, there is thus provided a projectile launcher operation monitoring device. The projectile launcher operation monitoring device includes at least one displacement sensor and a processor coupled with the at least one displacement sensor. The at least one displacement sensor is configured to acquire measurements relating to the displacement of the projectile launcher and to produce a sampled time signal of values relating to the displacement. The processor is configured to receive from the displacement sensor the sampled time signal to determine projectile launcher operation parameters from the sampled time signal by employing a deep-learning system. The deep-learning system includes an encoder. The encoder receives sample frames from the sampled time signal and produces codes relating to the sample frames. Each of the codes is a vector of values relating to the probabilities of features in the received sample frames.

In accordance with another aspect of the disclosed technique, there is thus provided a system for monitoring the operation of a plurality of projectile launchers. The system includes a plurality of projectile launcher operation monitoring devices and a monitoring server. Each projectile launcher operation monitoring device includes at least one displacement sensor and a processor coupled with the at least one displacement sensor. The at least one displacement sensor is configured to acquire measurements relating to the displacement of the projectile launcher and to produce a sampled time signal of values relating to the displacement. The processor is configured to receive from the displacement sensor the sampled time signal to determine projectile launcher operation parameters from the sampled time signal by employing a deep-learning system. The deep-learning system includes an encoder. The encoder receives sample frames from the sampled time signal and produces codes relating to the sample frame. Each of the codes is a vector of values relating to the probabilities of features in the received sample frames. The monitoring server is configured to communicate with the plurality of projectile launcher operation monitoring devices and to receive therefrom respective projectile launcher operation parameters.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
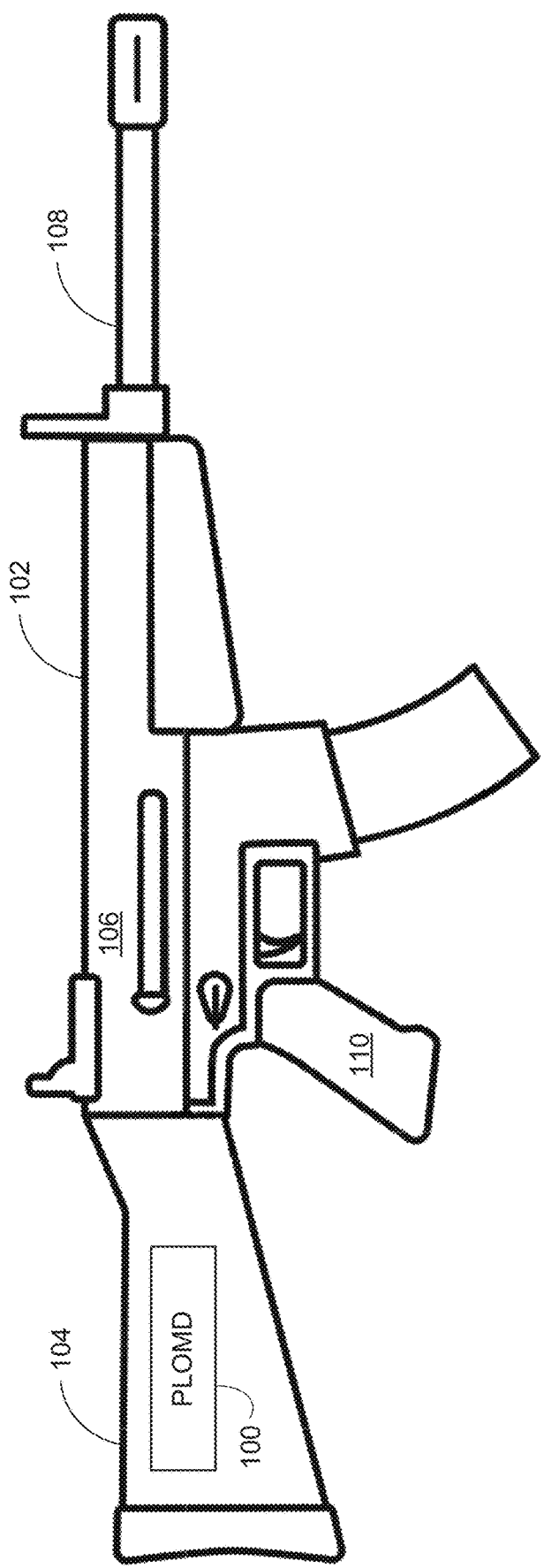
FIG. 1 is a schematic illustration of a PLOMD constructed and operative in accordance with an embodiment of the disclosed technique.

The disclosed technique overcomes the disadvantages of the prior art by providing a device, system and method for monitoring the operation of a projectile launcher. According to the disclosed technique, the operation of the projectile launcher can be monitored online (e.g., in real-time during use) or offline (e.g., for the purpose of incident debriefing). A 'projectile launcher' herein relates to a device launching a projectile from a barrel. A projectile launcher is, for example, a handgun, a rifle, a machine gun, a carbine, a submachine gun, a shotgun, a missile launcher, a rocket launcher, a grenade launcher, a tank and the like. 'Operation monitoring' herein relates to determining parameters relating to the operation of the projectile launcher. These projectile launcher operation parameters include, for example, indication of shot fired, the number of projectiles launched, type of projectile launched, direction of projection, magazine status (i.e., when a magazine is employed by the projectile launcher), operational phase of the launch (e.g., cocking, recoil), barrel temperature, launch speed (e.g., muzzle speed in rifles), direction of launch and position (i.e., location and/or orientation) of the projectile launcher. The projectile launcher operation parameters may also relate to events that occurred, for example, a change in safety selector position, magazine change, loading of a projectile, mechanical impact (e.g., projectile launcher falls). The projectile launcher operation parameters additionally relate to user status such as change in position (e.g., from standing to kneeling), grip, in motion or stationary. The projectile launcher operation parameters may further include maintenance related parameters such as, components (e.g., a recoil spring, a barrel) condition. Projectile launcher operation parameters optionally include an embedding vector or vectors (further explained below). The term 'determining projectile launcher operation parameters' relates herein to the detection of projectile launcher operation parameters and optionally to the classification of a projectile launcher operation parameters.

According to the disclosed technique, a Projectile Launcher Operation Monitoring Device (PLOMD) is attached to the projectile launcher at an arbitrary location on the projectile launcher and at an arbitrary orientation. The PLOMD includes a sensors array, which includes at least one sensor responsive to mechanical displacement (e.g., at least a single axis accelerometer or at least a microphone). A processor receives the raw signals from the sensors in the sensors array (i.e., no pre-processing is performed) and employs Artificial Intelligence (AI) techniques to determine the above mentioned projectile launcher operation parameters. The AI techniques employed shall be further elaborated below. The PLOMD according to the disclosed technique may further include a memory for storing the projectile launcher operation parameters. Additionally or alternatively, the PLOMD may include a transmitter for transmitting the projectile launcher operation parameters to a remote station such as a server, a computer, a portable device (e.g., smartphone, a tablet computer) an external memory and the like. As shall further be elaborated below, the projectile launcher operation parameters may be employed for maintenance purposes or for monitoring the projectile launcher during operation, for example, during battle conditions for battle management purposes.

Reference is now made to FIG. 1, which is a schematic illustration of a PLOMD, generally referenced 100, constructed and operative in accordance with an embodiment of the disclosed technique. In the example brought forth in FIG. 1, PLOMD 100 is located in the stock 104 of a rifle 102. Alternatively, PLOMD 100 may be located in the action 106, on the barrel 108 or in or on the handle 110. PLOMD 100 may also be attached to accessories which are attached to the projectile launcher (e.g., sights, scopes lasers and the like). As mentioned above, the location on the projectile launcher and orientation of PLOMD 100 is arbitrary. However, since AI techniques are employed in which training is required, the location and orientation of PLOMD 100 on projectile launcher 102 should comply (i.e., within tolerance) with a location and orientation in which PLOMD 100 was trained (i.e., there can be more than one location and orientation in which PLOMD 100 was trained).

Figure 2:
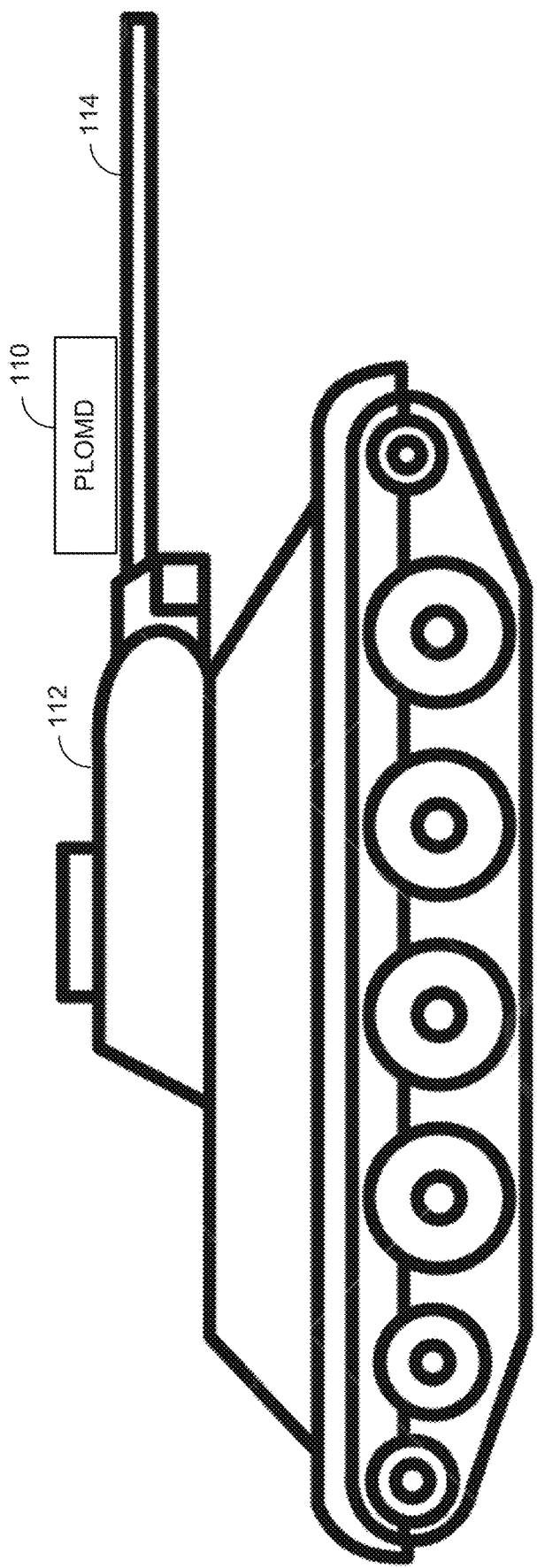
FIG. 2 is a schematic illustration of a PLOMD constructed and operative in accordance with another embodiment of the disclosed technique.

Reference is now made to FIG. 2, which is a schematic illustration of a PLOMD, generally referenced 110, constructed and operative in accordance with another embodiment of the disclosed technique. In the example brought forth in FIG. 2, PLOMD 110 is located in a barrel 114 of a tank 112. Alternatively, PLOMD 110 may be located in the action of the tank or on the haul. As mentioned above, since AI techniques are employed in which training is required, the location and orientation of PLOMD 110 on projectile launcher tank should comply (i.e., within tolerance) with a location and orientation in which PLOMD 110 was trained.

Figure 3:
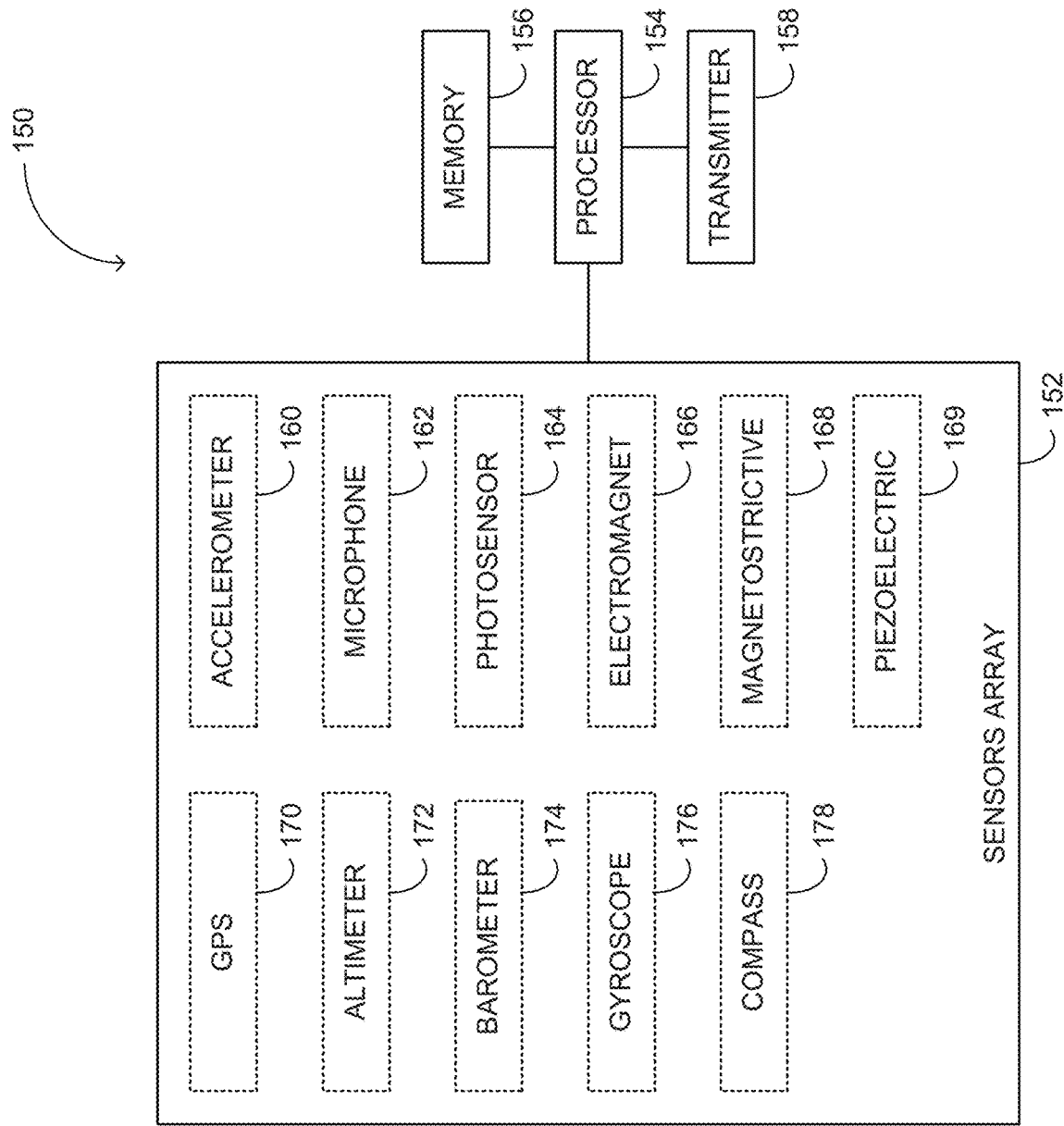
FIG. 3 is a schematic illustration of a PLOMD constructed and operative in accordance with a further embodiment of the disclosed technique.

Reference is now made to FIG. 3, which is a schematic illustration of a PLOMD, generally referenced 150, constructed and operative in accordance with a further embodiment of the disclosed technique. PLOMD 150 is configured to be attached to a projectile launcher similar to as described above in conjunction with FIGS. 1 and 2. PLOMD 150 includes a sensors array 152 and a processor 154. PLOMD 150 may further include a memory 156 and a transmitter 158.

The launch of a projectile results in a mechanical displacement of the launcher and, in some cases, the mechanical displacement of internal components of the projectile launcher (e.g., bolt carrier, recoil spring and the like). As such, in general, sensors array 152 includes at least one sensor responsive to such mechanical displacement. As such, sensors array includes at least one of an accelerometer 160, a microphone 162, photosensor 164, an electromagnet 166, a magnetostrictive sensor 168 and a piezoelectric sensor 169. In addition to a displacement sensor or sensors, sensors array 152 may include location, orientation and condition sensors such as a GPS 170, an altimeter 172, a barometer 174, a gyroscope 176 and a compass 178.

Accelerometer 160 and compass 178 can be replaced with a six degrees of freedom (i.e., 6 DOF) Inertial Measurement Unit which includes three accelerometers and three magnetometers providing information relating to the motion and orientation of PLOMD 100, and consequently of the projectile launcher to which it is attached, in a three dimensional spatial reference coordinate system, as well as a timestamp associated with each measurement. Also, Accelerometer 160 and compass 178, gyroscope 176 and barometer 174 may be replaced with a 10 DOF IMU. Microphone 162 may be embodied as a Micro-Electro-Mechanical Systems (MEMS) microphone. Transmitter 158 may be embodied as a wired or wireless transmitter. Transmitter 152 may be a Local Area Network (LAN) transmitter, a Bluetooth transmitter, a Near Field Communications (NFC) transmitter, a WiFi transmitter and the like. Processor 154 may be implemented as a Digital Signal Processor (DSP), a microcontroller, or a designated System on Chip (SoC) integrated circuit implemented with a Field Programmable Gate Array (FPGA) or on an Application Specific Integrated Circuit (ASIC). Processor 154 may include co-processor for specific computational complex tasks.

During operation, sensors array 152 acquires a plurality of measurements over time, relating to the mechanical displacement of the projectile launcher to which it is attached. In other words, each sensor in sensors array 152 produces a respective sampled time signal of values relating to the characteristic measured thereby. Sensors array 152 provides the acquired measurements to processor 154 and determines projectile launcher operation parameters. Processor 154 further associates each projectile launcher operation parameter with a respective timestamp. Processor 154 employs AI techniques to determine projectile launcher operation parameters. As further elaborated below, the AI techniques employed by processor 154 may be self-learning techniques. When the AI techniques employed are self-learning techniques, there is no need to calibrate, re-calibrated or re-train PLOMD 150 after it is attached to the respective projectile launcher.

Processor 154 may provide the determined projectile launcher operation parameters to memory 156. Alternatively or additionally, processor 154 may provide the determined projectile launcher operation parameters to transmitter 158. Transmitter 158 transmits the determined projectile launcher operation parameters to a remote station as well as the timestamps associated therewith. In addition to the projectile launcher operation parameters, transmitter 158 may also transmit metadata relating to the projectile launcher. This metadata include a unique identification (e.g., a serial number) of the projectile launcher and optionally data authentication indicators (e.g., Cyclic Redundancy Checks—CRC), the geographic location of the projectile launcher, as determined by GPS 164.

Such a remote station is, for example, a maintenance computer or a maintenance server, which employs the projectile launcher operation parameters to track and alert maintenance events. For example, when a component (e.g., a spring) is to be replaced after a predetermined number of projectiles are launched (e.g., the number of shots filed by a pistol). The maintenance server tracks the number of projectiles launched by the projectile launcher and alerts maintenance personnel when the component is to be replaced. As a further example, when a barrel is to be replaced due to over-heating, the maintenance server tracks the temperature of the barrel and alerts maintenance personnel of the barrel is to be replaced. According to another example, the effectiveness of the projectile launcher may be tracked for example by tracking the launch velocity (e.g., muzzle velocity of a rifle or a handgun). A decrease in the launch velocity may indicate a reduction in the effectiveness of the projectile launcher. According to yet a further example, the PLOMD is trained to alert when a malfunction is expected and in what component (e.g., barrel, recoil spring, striking pin).

According to another embodiment of the disclosed technique, one or more PLOMDs may be coupled with a Battle Management System (BMS), for example via a network. The PLOMD transmit the projectile launcher operation parameters respective thereof to the BMS. Following is an example of employing a PLOMD according to the disclosed technique with a BMS, in which PLOMDs are attached to a rifles carried by a soldiers during a mission. Reference is now made to FIGS. 4A-4G, which are a schematic illustration of a BMS, generally referenced 200, constructed and operative in accordance with another embodiment of the disclosed technique. System 200 includes a plurality of PLOMDs 2021, 2022, . . . , 202N, a plurality of soldier network transceivers 2041, 2042, . . . , 204N, a battle management server 206 and a network 208. Each one of PLOMDs 2021, 2022, . . . , 202N is coupled (i.e., either wirelessly or via a wire) with a respective one of soldier network transceivers 2041, 2042, . . . , 204N. Each one of soldier network transceivers 2041, 2042, . . . , 204N communicates with battle management server 206 via network 208. Thus, each one of PLOMDs 2021, 2022, . . . , 202N communicates with battle management server 206 via a respective on of soldier network transceivers 2041, 2042, . . . , 204N. During a mission, each one of soldier network transceivers 2041, 2042, . . . , 204N receives from the respective one of PLOMDs 2021, 2022, . . . , 202N projectile launcher operation parameters respective of the rifle held by the soldier along with respective metadata of the rifle. Each one of soldier network transceivers 2041, 2042, . . . , 204N transmits to battle management server 206 the respective projectile launcher operation parameters and rifle metadata, as well as additional information, for example, regarding the geographic location of the soldier, images and the like. Battle management server 206 presents a user or users with an image of the arena, with the various deployed forces and their status. It is noted that the geographic location of the soldier may be determined by a GPS located on the soldier and connected with the respective soldier network transceiver or from the GPS of the respective PLOMD (i.e., when a GPS is included in the PLOMD).

Figure 4A:
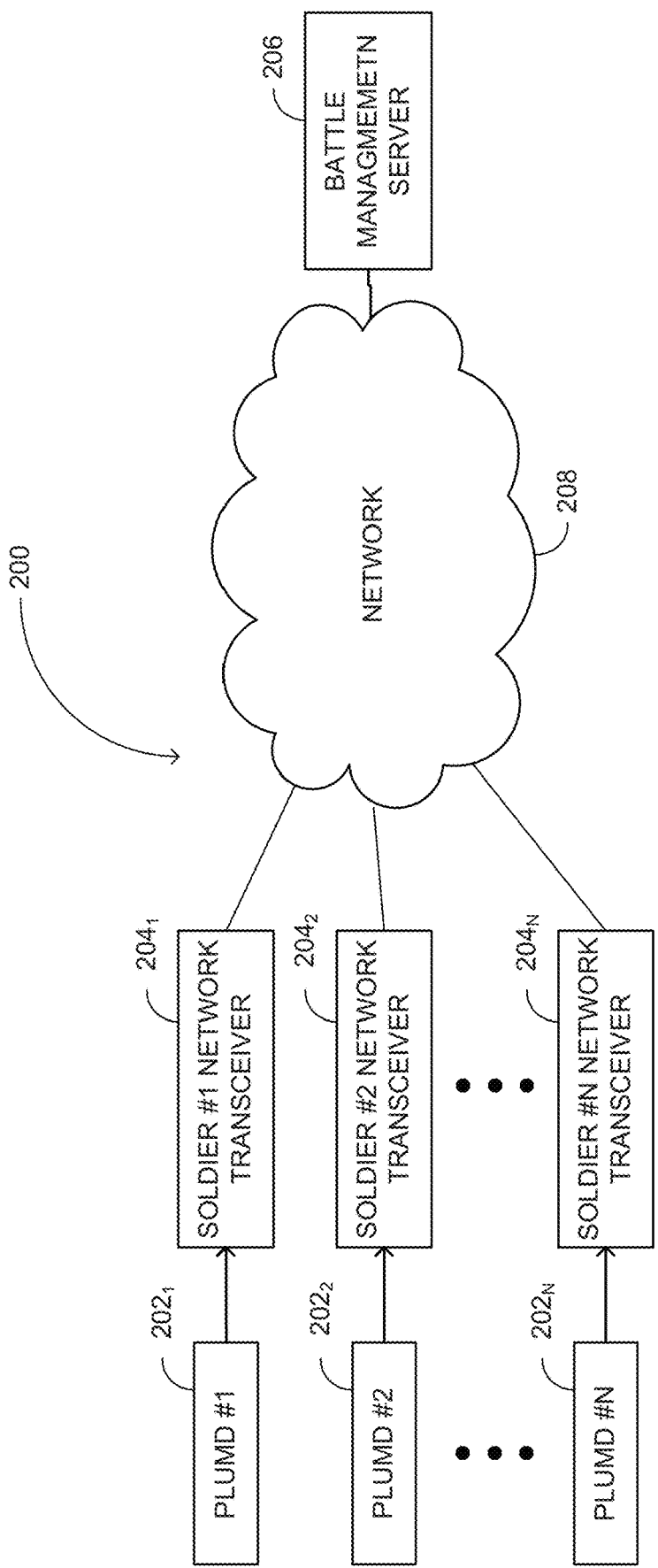
FIGS. 4A-4G are schematic illustrations of a BMS system constructed and operative in accordance with another embodiment of the disclosed technique.
Figure 4B:
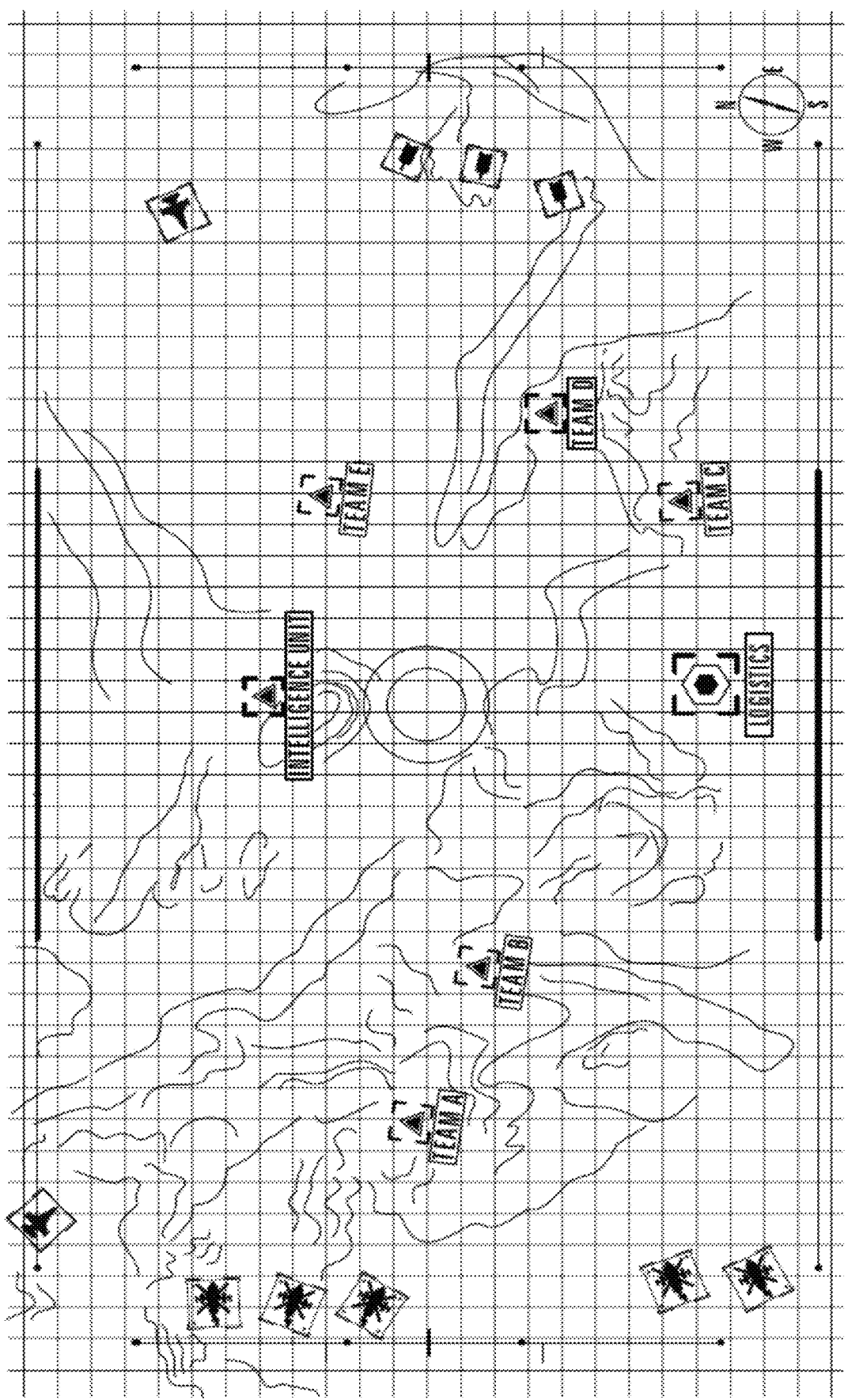
Figure 4C:
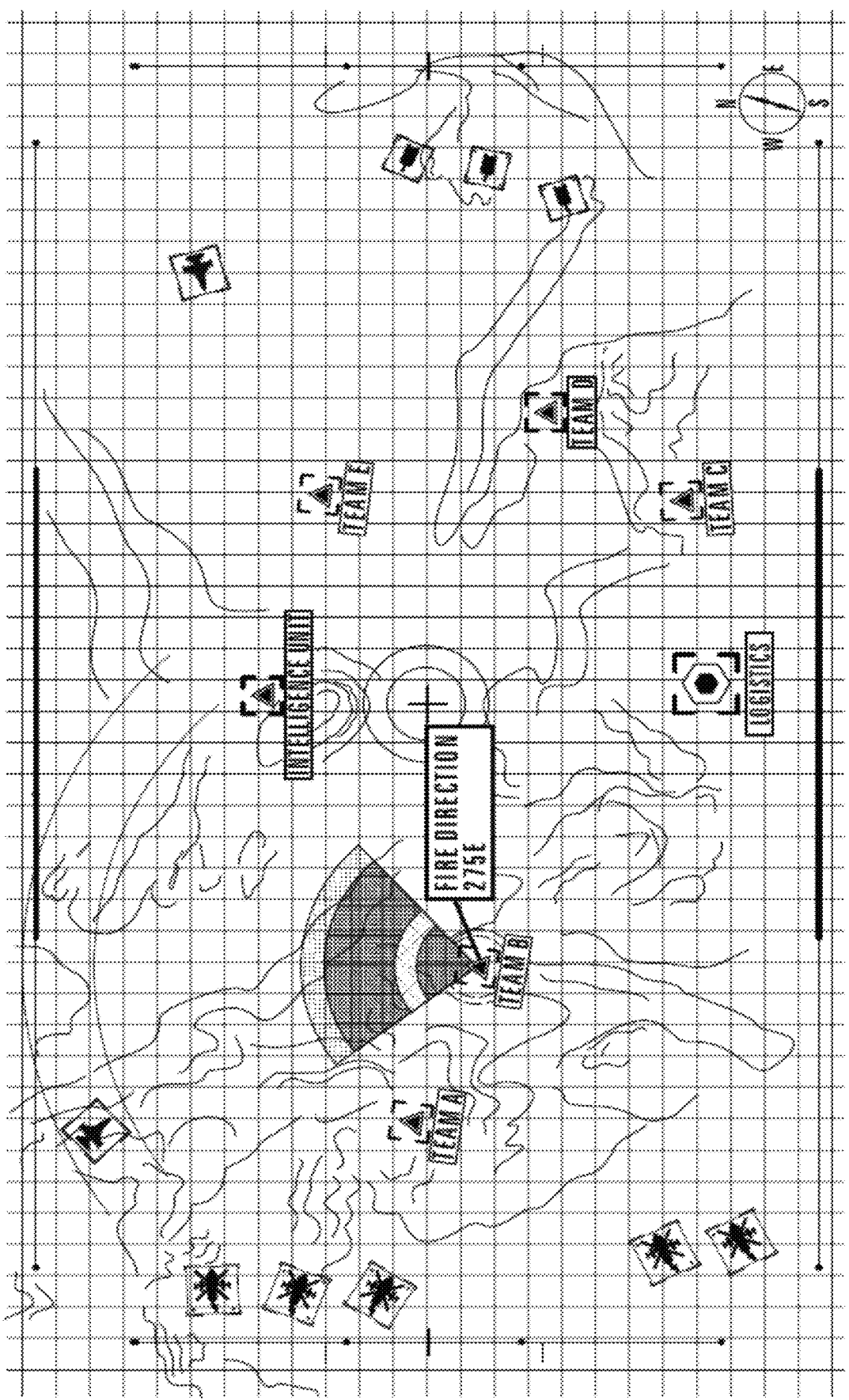
Figure 4D:
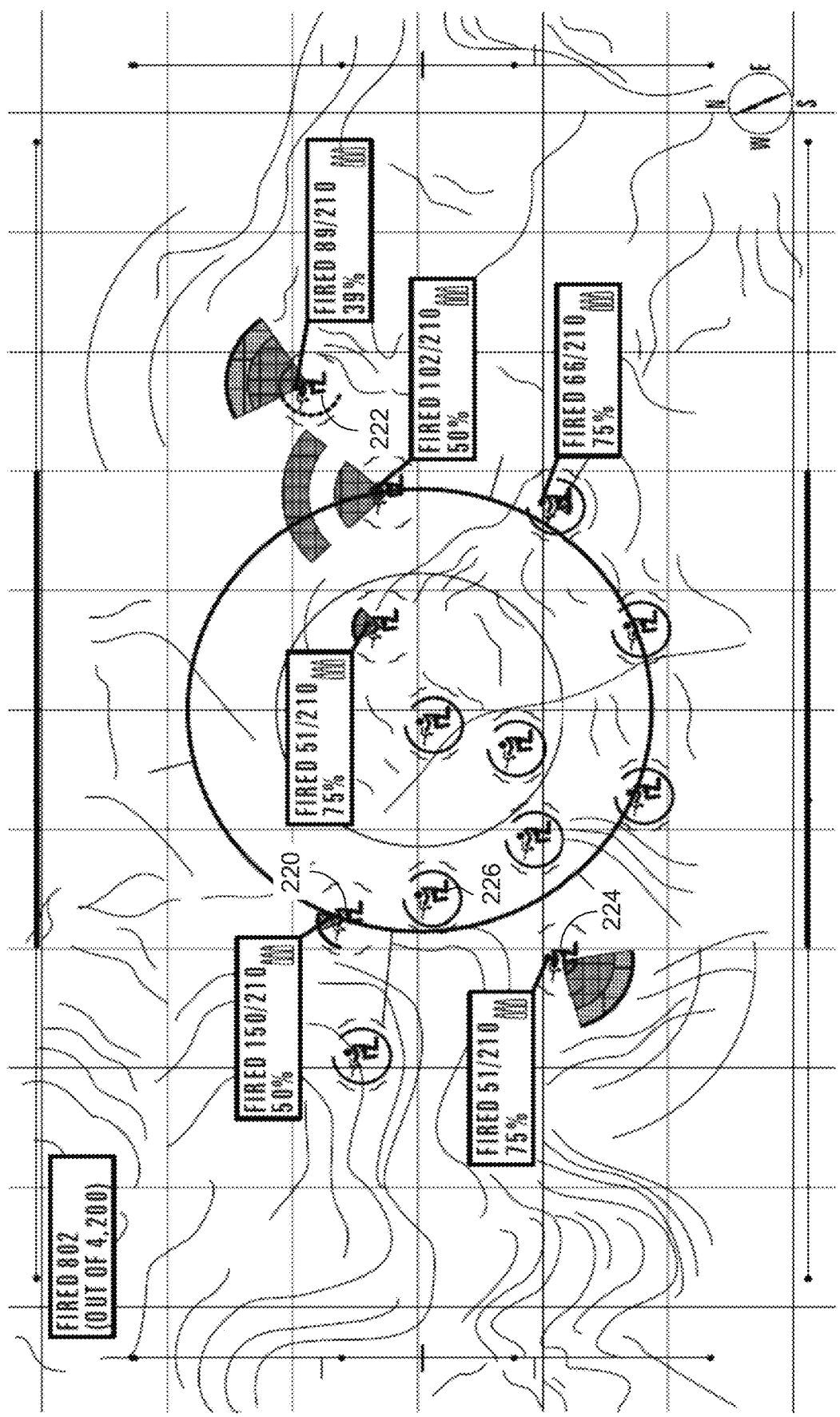

With reference to FIG. 4B, an exemplary image of an arena in which forces units and assets are deployed is depicted. With reference to FIG. 4C, BMS receives the projectile launcher operation parameters from the soldiers in team B and determines that shots had been fired and hence Team B is engaged. With reference to FIG. 4D, a situation awareness image of Team B is depicted. The projectile launcher operation parameters provide the BMS with information regarding the situation of rifle of each soldier in Team B. As can be seen in FIG. 4D, soldier 220 has shot approximately 50% of the ammunition available thereto, soldier 222 has shot approximately 39% of the ammunition available thereto, soldier 254 has shot approximately 75% of the ammunition available thereto. Also, seen in FIG. 4D is that soldiers 220, 222 and 224 are firing in different directions indicating that Team B is surrounded. It is also seen in FIG. 4D that, for example, soldier 226 is not firing. This might indicate soldier 226 is neutralized for some reason. Also depicted in the left top part of FIG. 4D is the ammunition status of Team B in total.

Figure 4E:
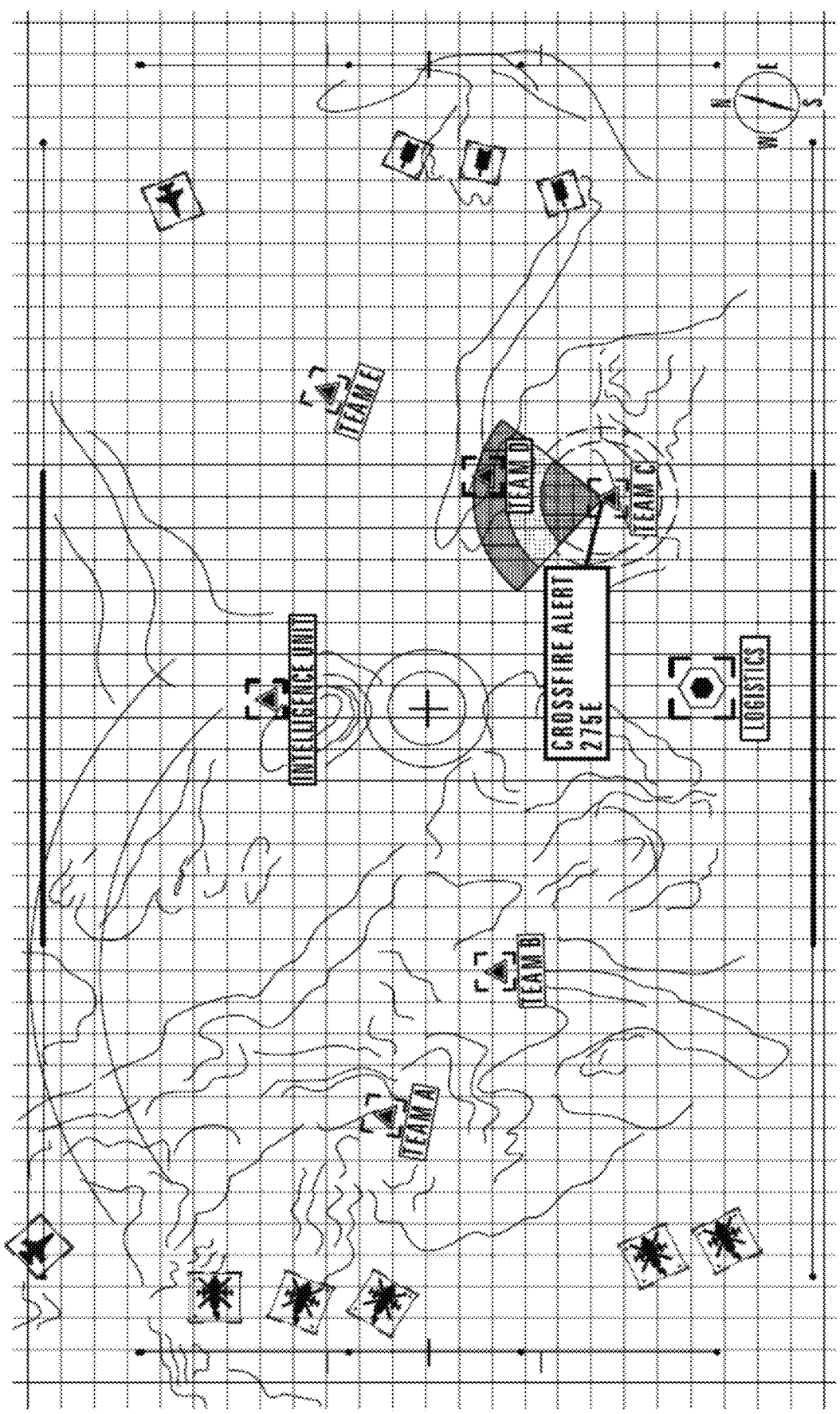

With reference to FIG. 4E, an alert of a potential crossfire situation, between Team C and Team D is depicted. In such a case the user of the BMS may alert teams C and D to the potential dangerous situation.

Figure 4F:
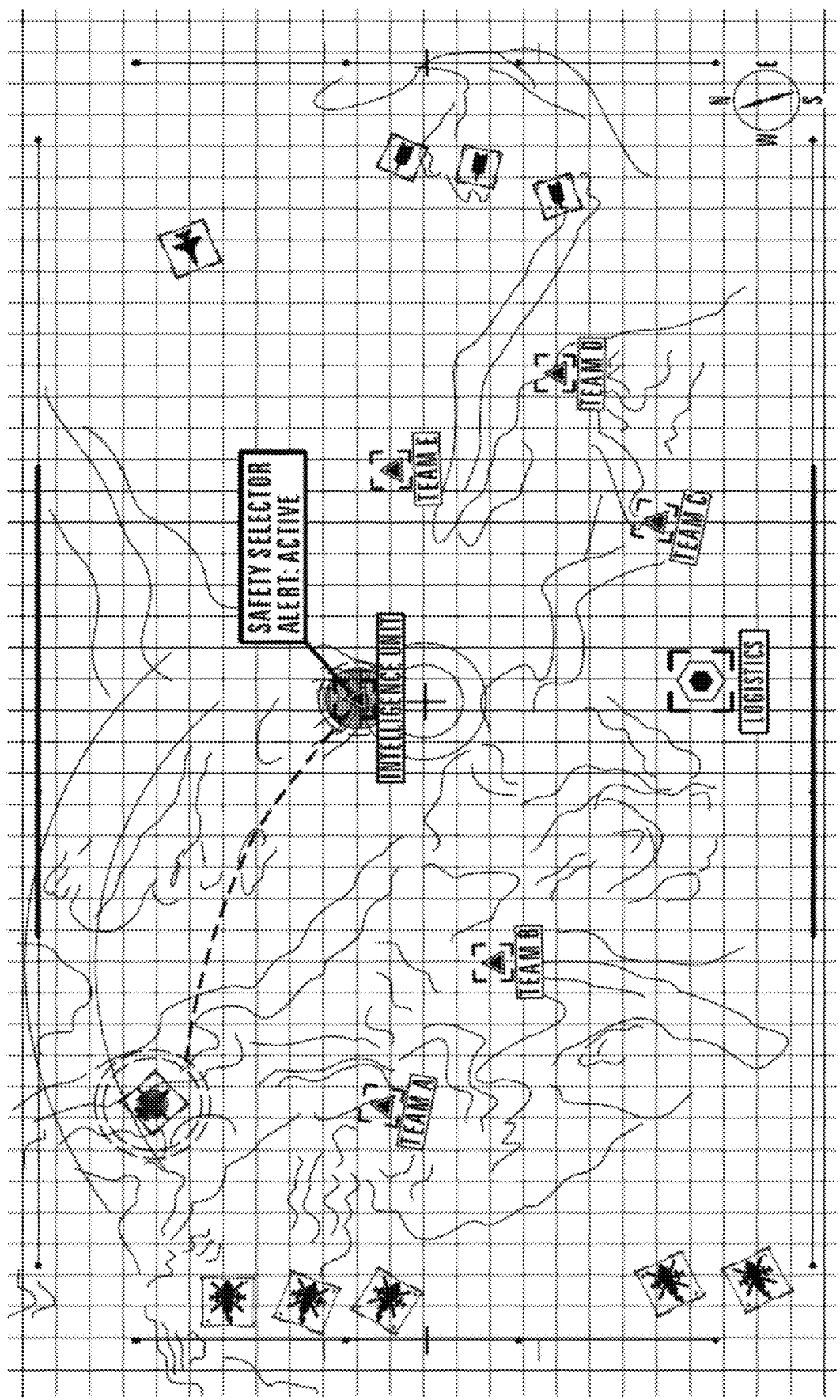

With reference to FIG. 4F, an alert that a soldier in the intelligence team has changed the state of the safety selector thereof is received by the BMS. Since the intelligence team should not generally engage in fire, this may indicate a potential evolving event. Consequently, the user of the BMS 206 can dispatch a drone to investigate further.

Figure 4G:
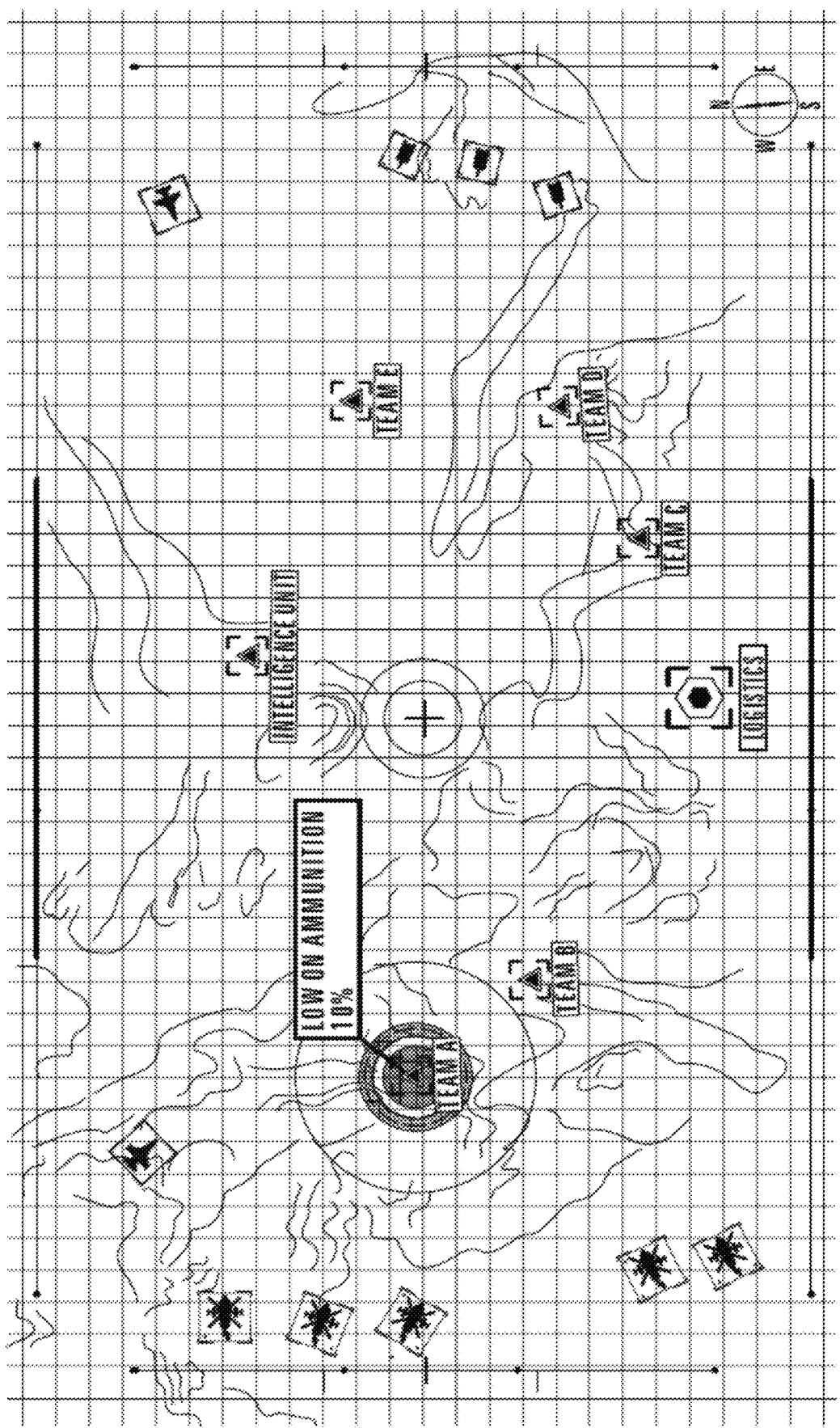

With reference to FIG. 4G, an alert that Team A is low on ammunition is displayed. A user of BMS 206 can dispatch a re-supply vehicle or aircraft or can decide to abort the mission of Team A.

As illustrated in FIGS. 4A-4G above, connecting a PLOMD according to the disclosed technique to BMS aids in clarifying the status of the arena and the forces deployed thereat as well as the situation of individual soldiers. This clarification, in turn, aid decision making and shortens the response time to evolving situations.

BMS system 200 depicted herein above is brought as an example only of a monitoring system. According to another alternative, PLOMDs 2021, 2022, . . . , 202N may communicate directly with BMS 206. In general, PLOMDs according to the disclosed technique can be employed with any monitoring system employed by an organization that requires monitoring of projectile launchers. For example, a police force or a security company employing armed security personnel. The PLOMDs according to the disclosed technique may also be employed for debriefing of events (i.e., actual or simulated), which can aid with training of armed forces (e.g., army, police, security firms) as well to enable enforceable accountability, for example, of manufacturers. In other words a PLOMD according to the disclosed technique be used as a 'Black Box' of the projectile launcher.

Figure 5C:
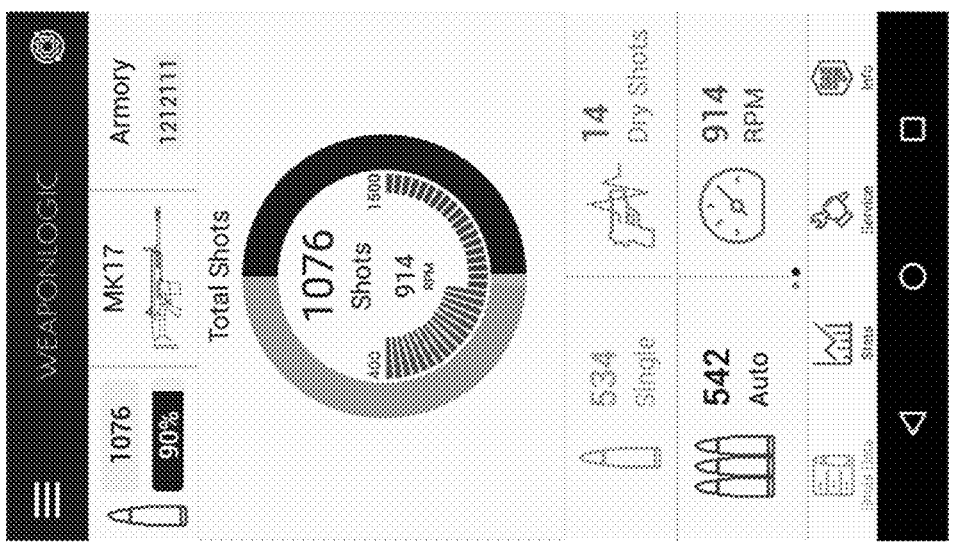
FIG. 5 is a schematic illustration of a deep learning system for determining projectile launcher operation parameters, constructed and operative in accordance with a further embodiment of the disclosed technique.
Figure 5B:
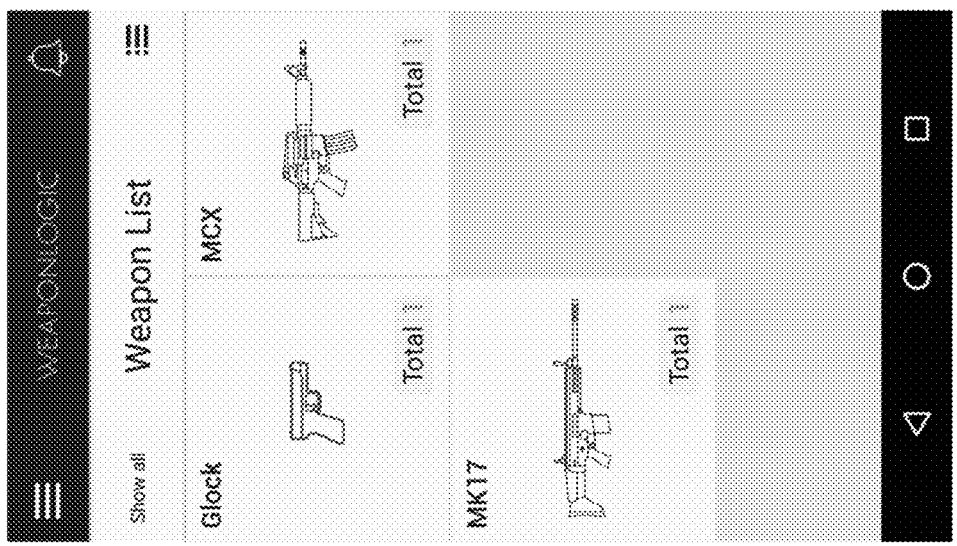
Figure 5A:
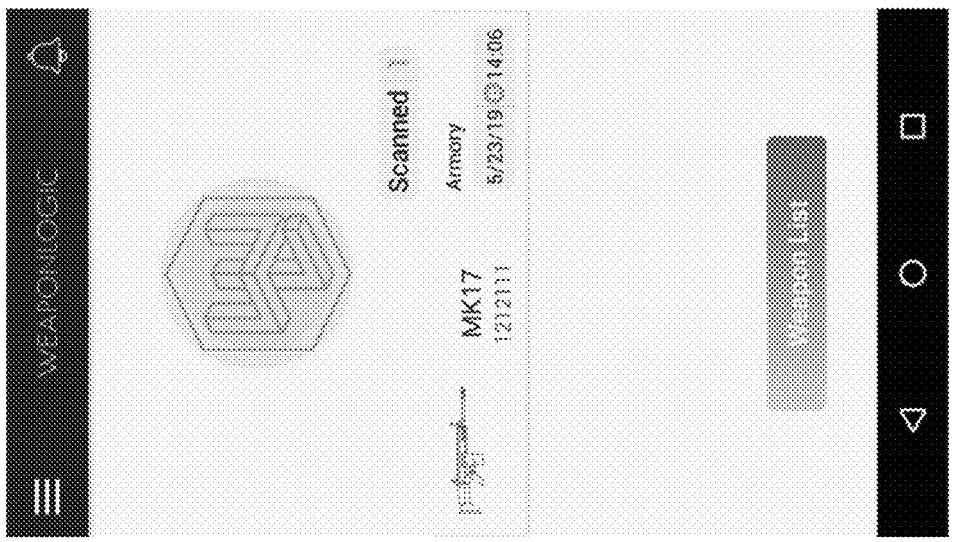
Figure 5F:
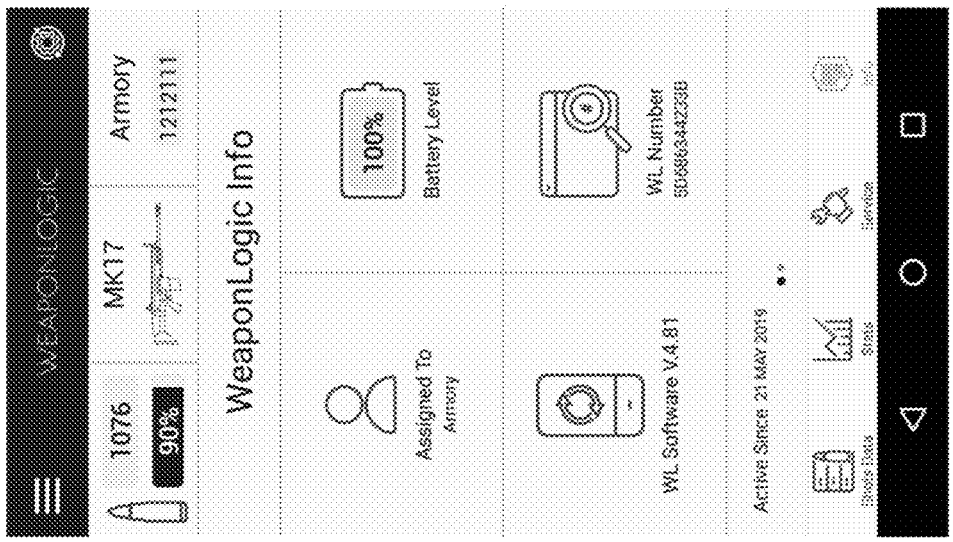
Figure 5E:
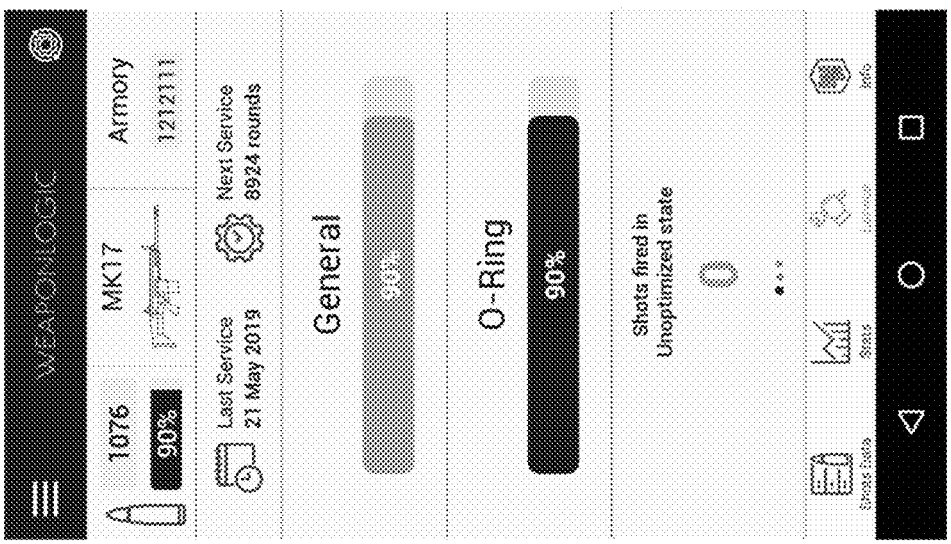
Figure 5D:
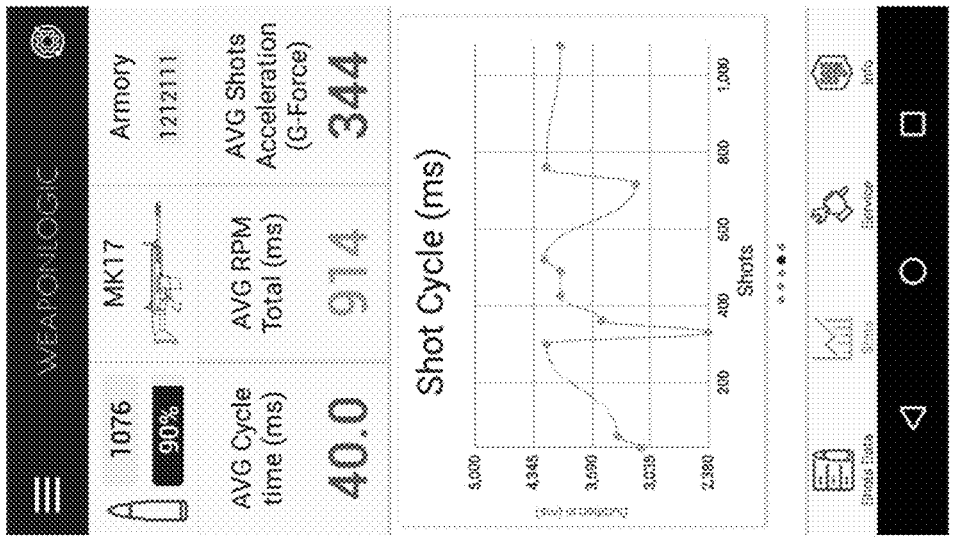

As mentioned above, a PLOMD according to the disclosed technique can transmit the projectile launcher operation parameters to a remote station. At the remote station, the information included in the projectile launcher operation parameters, related to a projectile launcher operation parameters may be presented to a user via a user interface. Reference is now made to FIGS. 5A-5F, which are schematic illustration of a user interface for presenting information relating to projectile launcher operation parameters, operative in accordance with a further embodiment of the disclosed technique. In FIGS. 5A-5F, the remote station is exemplified as a smartphone, which received the projectile launcher operation parameters from a PLOMD or PLOMDs, for example, via a Bluetooth. The smartphone may be connected to an armory server. With reference to FIG. 5A, an MK17 rifle, with the serial number 1212111 has been scanned by a smartphone employed by an armory. In FIG. 5B, a list of the current types of weapons stored in the armory and the number of items from each weapon is presented. With reference to FIG. 5B a weapons list of the currently stored weapons in the armory is depicted. The weapons list includes 1 Glock handgun, one MCX rifle and one MK17 rifle that are currently stored in the armory. With reference to FIGS. 5C-5F, the MK17 rifle serial number 1212111 was selected and information relating to this specific rifle is presented. All screens presented in FIG. 5C-5F include at the top the type of rifle selected, the serial number of the weapon, the total number of shots fired (i.e., 1076) and a general condition indicator (i.e., 90%). With reference to FIG. 5C, the MK17 rifle was selected and a screen presenting the shot data thereof is presented. The shot data includes the total number of shots fired (i.e., 1076), the number of shots fired in single mode (i.e., 534), the number of shots fired in automatic mode (i.e., 542), the number of dry shots (i.e., 14) and the firing rate (i.e., 914 rounds per minute—RPM). Firing rate may be a projectile launcher operation parameter or may be determined form the shot indications and the timestamps associated with each shot indication. With reference to FIG. 5D, a screen presenting shots statistics is depicted. In FIG. 5C, Shot statistics include the average cycle time of a shot (denoted 'AVG Cycle time (ms)' in FIG. 5C), the average rounds per minute (denoted 'AVG RPM Total (ms)' in FIG. 5C) and the averages shots acceleration measured in G-Force (denoted 'AVG Shots Acceleration (G-Force)' in FIG. 5C). Also in the screen depicted in in FIG. 5C is a graph presenting the shot cycle where the horizontal axis relates to the number of shots filed and the vertical axis relates to the duration of each shot in milliseconds (ms). With reference to FIG. 5E, a screen relating to the condition of the weapon and specific components is presented. This screen includes information relating to the dates of last service and the number of rounds before the next service is due. Also presented is a general condition indicator (i.e., 90%) and component condition indicator. For example, in FIG. 5D the condition of the O-ring is presented. Also presented is the number of shots fired when the weapon was not in an optimized state. This can trigger a more thorough inspection of the weapon. With reference to FIG. 5F, information relating to the user interface (e.g., name of assignee, software version etc.) is presented.

Figure 6:
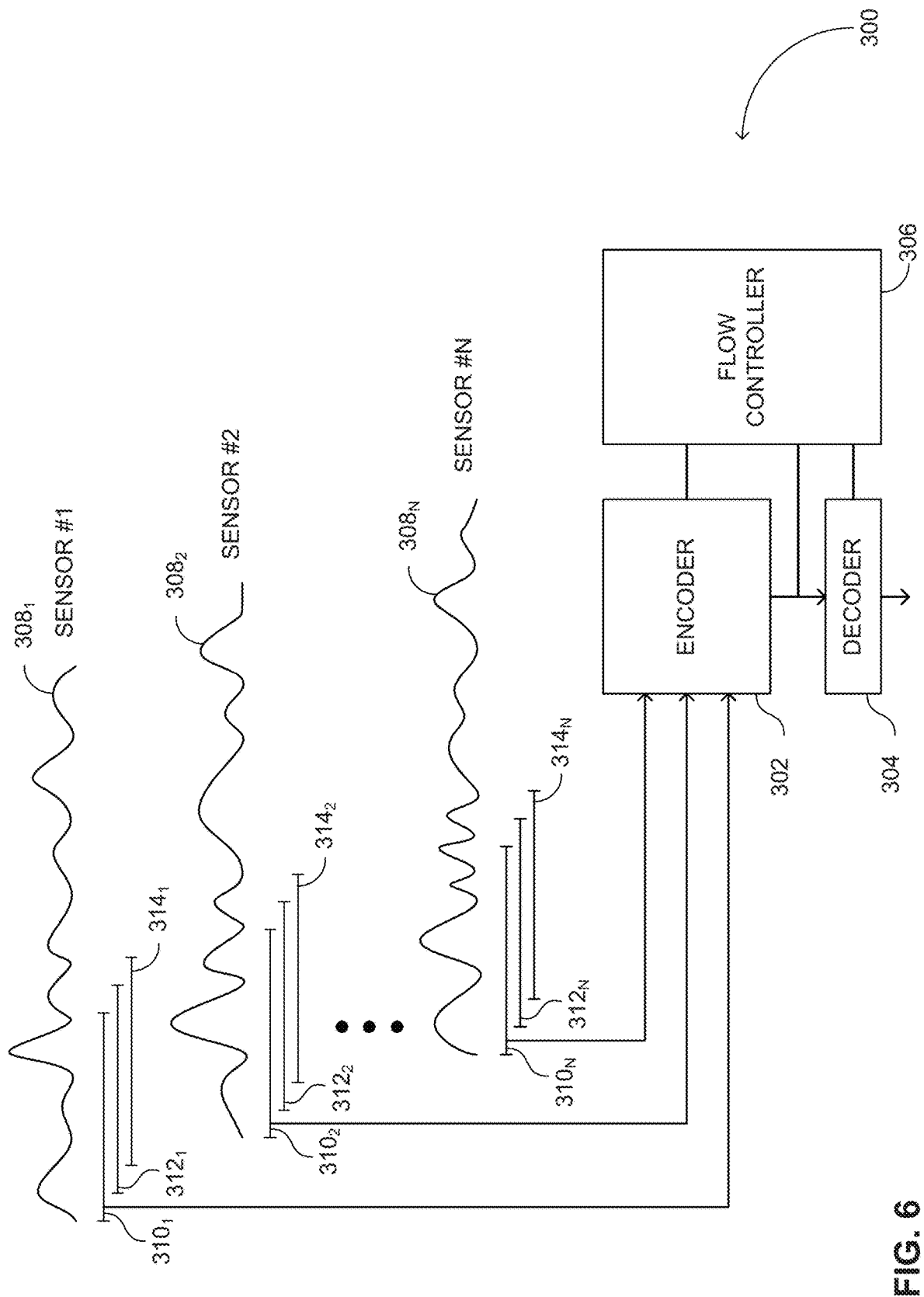
FIG. 6 is a schematic illustration of a deep learning system for determining projectile launcher operation parameters, constructed and operative in accordance with a further embodiment of the disclosed technique.

As mentioned above, a PLOMD according to the disclosed technique employs AI techniques, and specifically deep learning techniques to determine projectile launcher operation parameters. Reference is now made to FIG. 6, which is a schematic illustration of a deep learning system, generally referenced 300, for determining projectile launcher operation parameters, constructed and operative in accordance with a further embodiment of the disclosed technique. System 300 is implemented within processor 154 (FIG. 1). System 300 includes an encoder 302, a flow controller 306 and optionally includes a decoder 304. Flow controller is coupled with encoder 302 and decoder 304. Encoder 302 is coupled with decoder 304.

Encoder 302 receives from each sensor sample frames in a continuous manner. For example, at time T1, encoder 302 receives samples frame 3101 from sensor 1, samples frame 3102 from sensor 2 and samples frame 310N from sensor N. At time T2, encoder 302 receives samples frame 3121 from sensor 1, samples frame 3122 from sensor 2 and samples frame 313N from sensor N and at time T3 encoder 302 receives samples frame 3141 from sensor 1, samples frame 3142 from sensor 2 and samples frame 314N from sensor N. It is noted that the timing and size of each sensor sample frame need not be the same for each of the sensor. For example, an accelerometer may produce 3000 samples each second and a microphone may produce 16000 samples per second. Since encoder 302 employs deep-learning techniques, encoder 302 is trained account for the differences in the timing and size of the sensors sample frames.

Encoder 302 receives sample frames from the raw signal of the sensors and produces a code or codes relating to these sample frames. Each code is a vector of values relating to the probabilities of features in the sample frames (i.e., an embedding vector). Encoder 302 is embodied as a Residual Attention Convolutional Neural Network, that utilized Dilated Convolutions to enlarge the Receptive Field, and that consists of several stacked Attention-Residual blocks. Alternatively, encoder 302 is embodied as a Recurrent Neural Network (RNN), a Transformer Neural Network or a Bidirectional Encoder Representations from Transformers (BERT). In general, the temporal receptive field of encoder 302 should be larger than the longest prominent event. Also the encoder 302 is configured to track both long-term and short-term dependencies in the input sequences depending on the operation parameter being determined. For example, detecting and classifying a single shot requires a 'short' period of signal (e.g., between 30-100 milliseconds), since the most significant features relating to a shot occur during such a time period. However, determining the condition of a barrel requires a signal period of minutes and even hours. Furthermore, encoder 302 is also configured to use minimal computational resources. Encoder 302 provides the codes generated thereby to decoder 304. Optionally, encoder 302 provides the codes generated thereby to a memory (e.g., memory 156—FIG. 1) and/or to a transmitter (e.g., transmitter 158—FIG. 1) for transmitting to a remote station.

Decoder 304 segments and classifies the received codes from encoder 302 to detect and classify different projectile launcher operation parameters such as shots (e.g. single, bursts), ammunition type, operation phases (e.g. cocking, recoil), change in user status and mechanical impact. Decoder 304 employs regression to infer continuous time signals relating projectile launcher operation parameters such as launch speed (e.g., muzzle speed), barrel temperature, magazine status (i.e., how many projectiles are left in the magazine), malfunction prediction (e.g., when a malfunction is predicted or the probability that a malfunction will occur), and components condition. It is noted that decoder 304 may be separate (e.g., located on the maintenance server or the BMS server) from system 300 to reduce the computational complexity and thus power consumption. Decoder 304 provides the projectile launcher operation parameters determined thereby to a memory (e.g., memory 156—FIG. 1) and/or to a transmitter (e.g., transmitter 158—FIG. 1) for transmitting to a remote station.

Flow controller 306 controls the operation of encoder 302 and decoder 304 for the purpose of power management, while maintaining a predetermined probability that all events of interest are detected (i.e., maintaining a predetermined probability of false negatives). To that end, flow controller 306 receives from encoder 302 information from skip connectors and 'peepholes' of the Residual Attention Convolutional Neural Network. Also flow controller 306 receives the output from encoder 302 and of decoder 304. Flow controller 306 is configured to detect an event candidate or a non-event by implementing an event candidate or non-event detector at selected layers of encoder 302 and decoder 304, using the output from the above mentioned skip connectors and 'peepholes'. When flow controller 306 detects a non-event, then flow controller 306 stops the operation of encoder 302 prior to completion of the encoding process or prevents the decoder to initiate the decoding process or stop decoder 304 prior to the completion of the decoding process or processes. Otherwise, the operation of encoder 302 and decoder 304 continues. Flow controller 306 is also implemented as a neural network (e.g., Dilated Convolutional Neural Network, RNN, Gated Recurrent Unit—GRU, and Long Short-Term Memory—LSTM).

As mentioned above, employing AI techniques to determine projectile launcher operation parameters enables employing the raw signal from the sensors, without pre-processing and without calibrating or re-calibrating the PLOMD. Deep learning system 300 described above, is configured to calibrate, learn and evolve without human supervision. For example, by collecting different statistics of each sensor (e.g. mean, standard deviation, dynamic-range and the like) system 300 can correct the parameters of the Inputs of a Normalization Layer over time to achieve better predictions. Once deployed, system 300 is configured to continue and learn unsupervised, and to adapt to a specific launcher on which it is installed, for example, by employing statistics regarding the distribution of different events. System 300 expects to detect Silence, Impacts and Shots in a descending order of probabilities. Thus, by tracking the distribution of the events detected thereby over time, system 300 corrects the output predictions to meet the expected ones. System 300 is also configured to periodically optimize the neural network employed thereby, for example, by pruning the matrices (i.e., weights of each layer) according to statistics relating to the activity of each layer in the neural network. Furthermore, the matrices may be compressed using kernel methods such as Principal Component Analysis (PCA), Independent Component Analysis (ICA) and the like.

Deep learning system 300 described above requires training prior to installation. Training learning system 300 may be Semi-supervised or Unsupervised Using Autoencoding and Generative Adversarial Networks (GAN) to train the Encoder. Connectionist Temporal Classification (CTC) is employed to align the sensor signals to a loose and sparse transcription. Also, Knowledge Distillation can be employed, using a Teacher/Student methodology, where a large neural network is trained and then that network is employed to train a smaller network. When employing a Teacher/Student methodology the output form hidden layers of the Teacher may be employed as inputs to hidden layers of the student. Furthermore, Graph Pruning is used to compress the computation graph of each network.

Training sets training deep learning systems, such as deep learning system 300, employed for determining projectile launcher operation parameters are not readily available. Consequently, preparing such a database is complex and thus, expensive. According to the disclosed technique GANs are employed to generate training-sets by training these GANs to synthesize the sensor signals relating to various events thus augmenting existing training-sets. These GANs can also be trained to perform various transformations (e.g. applying typical channel distortions, simulating data-loss) in order to enlarge the training-set.

It will be appreciated by persons skilled in the art that the disclosed technique is not limited to what has been particularly shown and described hereinabove. Rather the scope of the disclosed technique is defined only by the claims, which follow.

The invention claimed is:

1. Projectile launcher operation monitoring device, comprising:
    at least one displacement sensor, configured to acquire measurements relating to the displacement of said projectile launcher and to produce a sampled time signal of values relating to said displacement; and
    a processor, coupled with said at least one displacement sensor, said processor configured to receive from said displacement sensor said sampled time signal to determine projectile launcher operation parameters from said sampled time signal, employing a deep learning system, said deep-learning system includes an encoder, said encoder receives sample frames from said sampled time signal and produces codes relating to said sample frames, each of said codes is a vector of values relating to the probabilities of features in said received sample frames; and
    wherein said projectile launcher operation parameters include at least the probability of malfunction.

2. The device according to claim 1, wherein said deep learning system further includes a flow controller, coupled with said encoder, said flow controller configured to detect an event candidate or a non-event, when said flow controller detects a non-event said flow controller stops the operation at least of said encoder.

3. The device according to claim 2, wherein said deep-learning system further includes a decoder, coupled with said encoder and with said flow controller, said decoder receiving said at least one code from said encoder and at least classifies said projectile launcher operation parameters.

4. The device according to claim 3, wherein said decoder further infers continuous time signals relating to selected projectile launcher operation parameters.

5. The device according to claim 1, wherein said projectile launcher operation parameters are selected from the group consisting of:
Indication of shot fired;
the number of projectiles launched;
type of projectile launched;
direction of projection;
magazine status;
operational phase of the launch;
barrel temperature;
launch speed;
direction of launch;
position of said projectile launcher;
change in safety selector position;
magazine change;
loading of a projectile;
mechanical impact;
change in user position;
grip;
motion of the launcher;
components condition; and
expected time of malfunction.

6. The device according to claim 1, being configured to communicate with a projectile launcher monitoring system.

7. The device according to claim 6, wherein said launcher monitoring system is a battle management system.

8. The device according to claim 6, wherein said launcher monitoring system is a maintenance system including said at least a probability of malfunction operation parameter.

9. The device according to claim 1, wherein said at least one displacement sensor is at least one of:
an accelerometer;
a piezoelectric sensor;
a microphone;
a photosensor;
an electromagnet; and
a magnetostrictive sensor.

10. The device according to claim 1, further including at least one of:
GPS;
an altimeter;
a barometer;
a gyroscope; and
a compass.

11. The device according to claim 1, further including a memory coupled said with processor, said memory storing said projectile launcher operation parameters.

12. The device according to claim 1, further including a transmitter coupled with said processor, said transmitter transmitting said projectile launcher operation parameters to a remote station.

13. A system for monitoring the operation of a plurality of projectile launchers including:
a plurality of projectile launcher operation monitoring devices each projectile launcher operation monitoring device including:
at least one displacement sensor, configured to acquire measurements relating to the displacement of said projectile launcher and to produce a sampled time signal of values relating to said displacement; and
a processor, coupled with said at least one displacement sensor, said processor configured to receive from said displacement sensor said sampled time signal to determine projectile launcher operation parameters from said sampled time signal, employing a deep-learning system, said deep-learning system includes an encoder, said encoder receives sample frames from said sampled time signal and produces codes relating to said sample frames, each of said codes is a vector of values relating to the probabilities of features in said received sample frames;
wherein projectile launcher operation parameters include at least the probability of malfunction; and
a monitoring server, configured to communicate with said plurality of projectile launcher operation monitoring devices and to receive therefrom respective said projectile launcher operation parameters.

14. The system according to claim 13, wherein said deep learning system further includes a flow controller coupled with said encoder, said flow controller including event candidate or non-event detector, when said flow controller detects a non-event said flow controller stops the operation at least of said encoder.

15. The system according to claim 14, wherein said deep-learning system further includes a decoder, coupled with said encoder and with said flow controller, said decoder receiving said at least one code from said encoder and at least classifies said projectile launcher operation parameters.

16. The system according to claim 15, wherein said decoder further infers continuous time signals relating to selected projectile launcher operation parameters.

17. The system according to claim 13, wherein said projectile launcher operation parameters are selected from the group consisting of:
Indication of shot fired;
the number of projectiles launched;
type of projectile launched;
direction of projection;
magazine status;
operational phase of the launch;
barrel temperature;
launch speed;
direction of launch;
position of said projectile launcher;
change in safety selector position;
magazine change;
loading of a projectile;
mechanical impact;
change in user position;
grip;
motion of the launcher;
components condition; and
expected time of malfunction.

18. The system according to claim 13, wherein said at least one displacement sensor is at least one of:
an accelerometer;
a piezoelectric sensor;
a microphone;
a photosensor;
an electromagnet; and
a magnetostrictive sensor.

19. The system according to claim 13, further including at least one of:
GPS;
an altimeter;

a barometer;
a gyroscope; and
a compass.

20. The system according to claim 13, wherein each one of said projectile launcher operation monitoring devices further includes a memory coupled said with processor, said memory storing said projectile launcher operationl parameters.

21. The system according to claim 13, wherein each one of said projectile launcher operation monitoring devices further includes a transmitter coupled with said processor, said transmitter transmitting said projectile launcher operation parameters to a remote station.

\* \* \* \* \*